United States Patent [19]

Berna et al.

[11] 4,395,669
[45] Jul. 26, 1983

[54] ELECTRICAL MACHINE HAVING CONTROLLED CHARACTERISTICS AND ITS APPLICATION TO A WIND-DRIVEN MACHINE

[75] Inventors: Michel Berna, Domont; Michel Kant; Jean P. Vilain, both of Thourotte; René Seger, Limeil Brevannes, all of France

[73] Assignee: Association Gradient, Compiegne, France

[21] Appl. No.: 160,842

[22] Filed: Jun. 19, 1980

[30] Foreign Application Priority Data

Jun. 20, 1979 [FR] France .................. 79 15809

[51] Int. Cl.³ .................. H02K 29/00; H02P 9/00
[52] U.S. Cl. .................. 318/502; 310/200; 318/138; 322/35; 322/93
[58] Field of Search .................. 322/29, 32, 35, 89–95, 322/71; 290/44, 55; 310/200; 318/495, 497, 502, 408, 340, 354, 424, 523–526, 138

[56] References Cited

U.S. PATENT DOCUMENTS

| | | | |
|---|---|---|---|
| 3,508,138 | 4/1970 | Schatz | 322/94 X |
| 3,643,143 | 2/1972 | Rakes | 318/502 X |
| 3,651,368 | 3/1972 | Hanada | 318/354 X |
| 3,694,731 | 9/1972 | Cherry | 322/29 X |
| 3,784,888 | 6/1972 | Geiersbach et al. | |
| 3,840,790 | 8/1972 | Stich et al. | |
| 3,938,013 | 2/1976 | Seilly et al. | 318/497 X |
| 4,059,771 | 11/1977 | Jacobs et al. | 322/35 X |
| 4,198,572 | 4/1980 | Kant | |
| 4,217,529 | 8/1980 | Bourke et al. | 318/523 X |

FOREIGN PATENT DOCUMENTS

| | | |
|---|---|---|
| 1231794 | 7/1967 | Fed. Rep. of Germany . |
| 1398393 | 3/1965 | France . |
| 1553046 | 1/1969 | France . |
| 2006575 | 12/1969 | France . |
| 2139649 | 5/1973 | France . |
| 2191338 | 5/1976 | France . |
| 2195869 | 5/1978 | France . |
| 1247104 | 9/1971 | United Kingdom . |
| 1293291 | 10/1972 | United Kingdom . |
| 2001808 | 7/1977 | United Kingdom ........ 322/93 |

Primary Examiner—R. J. Hickey
Attorney, Agent, or Firm—Cushman, Darby & Cushman

[57] ABSTRACT

The invention provides an electrical machine having an inductor and an armature at least one of which has at least two independent winding assemblies. The switching into and out of circuit of each winding assembly is controlled by a processor which receives monitoring parameters of the machine and desired value parameters, thereby controlling in real time the operating characteristics of the machine. The machine may be a wind-driven generator.

5 Claims, 6 Drawing Figures

ELECTRICAL MACHINE HAVING CONTROLLED CHARACTERISTICS AND ITS APPLICATION TO A WIND-DRIVEN MACHINE

BACKGROUND OF THE INVENTION

1. Field of the Invention

The present invention relates to a linear or rotary, direct or alternating current electrical motor or generator whose characteristics can be controlled as desired, and also to a wind-driven electrical machine incorporating a generator, constructed in accordance with the invention.

2. Description of the Prior Art

In known electrical machines, whatever their type, the electric supply current to the armature winding of an electric motor, or the current supplied by the armature winding of a generator, circulates continuously in each turn of the armature winding, first in one direction and then in the other, depending on which inductor pole it is influenced by. As illustrated by the accompanying FIGS. 1a and 1b, which show respectively the variations of the magnetic field produced by the inductor, and the current circulating in a turn of the armature winding, in dependence on the angle of rotation of the rotor in a direct current electric motor, there is a large zone, shown hatched in FIG. 1b, in which the current circulating in the armature winding participates only to a very slight extent in the production of a torque, and in which this current dissipates energy uselessly by the Joule effect when the turn is situated between two poles of the inductor.

It is known to construct electrical machines in which the speed of rotation of the rotor is variable. However, in numerous applications it is desirable to be able to control the variations of power in dependence on this speed.

It is an object of the invention to provide an electrical machine in which the total losses (in the magnetic and electrical circuits) are minimal, and whose characteristics can be controlled as desired. This machine may have one or more of the following characteristics:

fixed maximum output whatever the speed;
constant voltage over a wide speed range;
constant torque over a wide speed range;
variable torque in accordance with a precise function whatever the load;
fixed maximum output whatever the characteristics of the mechanical driving machine (drive motor) when the machine is functioning as a generator;
fixed maximum output whatever the characteristics of the driven machine when the machine is functioning as a motor.

SUMMARY OF THE INVENTION

The invention provides an electrical machine which comprises a fixed part and a moving part which is adapted to transform mechanical energy into electrical, or vice versa, by means of an inductor and an armature. It is immaterial whether the inductor or the armature is situated on the moving part or on the fixed part. The inductor and/or the armature of this machine has or have at least two independent winding assemblies in which the beginning and the end of conduction, in time and in space, are determined by a memory processor controlled by at least one monitoring signal representing a monitoring parameter of the machine, for example, the speed of displacement and/or the position of the magnetic field set up by the inductor, and by a programme stored in the memory, for the purpose of modifying in real time the operating characteristics of the machine.

The division of the armature and inductor into a plurality of independent winding assemblies in which the beginning and end of conduction are controlled by means of a processor makes it possible to suppress Joule effect losses which correspond to the hatched portion of FIG. 1b, by limiting the conduction of each of these assemblies to the period during which the assembly is under the influence of a pole of the inductor. In addition, it is possible to control the characteristics of the machine by limiting the period of conduction of each winding assembly to a part of the zone thus defined, as illustrated in FIG. 2 which shows the variations of the current circulating in a turn of the armature winding in dependence on the angle of rotation of the rotor in a D.C. machine constructed in accordance with the invention.

The memory processor may control the interconnection of at least two of the winding assemblies. This amounts to changing the number of turns of each assembly.

In a preferred embodiment of the invention, detection means detect the instantaneous position of the inductor field of the machine, the processor supplies coded control instructions, and an independent switching means is associated with each winding assembly in order to control the opening of a circuit containing that winding assembly or the closing of that circuit at suitable voltage levels when the inductor field occupies positions corresponding to the coded control instructions.

The detection means supplies logic signals which together represent the instantaneous position of the inductor magnetic field, one of these logic signals, or a complementary signal, being applied to each of the coded inputs of an even number of multiplexers controlled by the processor for the purpose of supplying at their output the logic signal applicable to their corresponding coded input, the logic signals supplied by each multiplexer being grouped together in twos in order to define connection and/or switching instructions applied to each of the switching means. Each switching means may then comprise two series of power semiconductors (transistors or thyristors) responsive to the connection instructions and operable to close the circuit of the corresponding winding assembly at the appropriate voltage level.

In an alternative embodiment disconnection means are associated with each switching means for opening for a time the circuit of the corresponding winding assembly when the current intensity exceeds a predetermined threshold.

In another alternative embodiment current limiting means are associated with each switching means in order to open or close the circuit of the corresponding winding assembly when the current intensity is above or below a predetermined threshold, the operation being that of a self-regulating chopper.

The coded control instructions supplied by the processor are such that the connection instructions applied to one or more of the switching means are chopped, so that the supply voltage of the corresponding winding assembly or assemblies is cut off at a predetermined frequency, in accordance with the operation of a simple chopper.

The detection means may comprise a plurality of detectors which may be optical, magnetic, capacitive, or acoustic, distributed over the fixed part of the machine in such a manner as to supply the logic signals characterising the position of the inductor magnetic field.

In the most general case the inductor and the armature are divided into a plurality of independent winding assemblies in which the passage of current is controlled by the means previously described. The supply network to which the inductor is connected may be a direct or a single-phase or multi-phase alternating voltage. Similarly, the armature may be fed by a direct or single-phase or multi-phase alternating voltage system, or may supply a direct voltage or an alternating single-phase or multi-phase voltage. A number of alternative arrangements may be based on the principle explained above as follows:

a machine in which the inductor is a permanent magnet;

a machine in which the conventional inductor, supplied direct from a direct or alternating electric supply system, produces a fixed field or a field rotating in space. In this case the logic system controls only the windings of the armature. Nevertheless, the winding of the inductor may be divided into a plurality of parts connected to movable or fixed supply terminals, and the form and intensity of the magnetic field set up by the inductor may be modified by using the same processor as is used for determining the conduction periods of each of the armature windings;

a machine in which the armature, carrying the winding of the conventional type for alternating current machines, is connected direct to the front side of rotating or movable terminals on the supply network. In a machine of this kind the processor controls only the inductor windings;

a machine in which the armature is closed electrically on itself such as a squirrel cage or solid type machine;

a machine in which the inductor is composite and consists of a wound part and a part consisting of a permanent magent.

In order to reduce the armature reaction inside the inductor, the inductor may consist of magnetic material fragmented into surfaces substantially parallel to the magnetic field set up by the inductor, the different fragments being separated by strips of a non-magnetic material. In this case, when the non-magnetic material is one which is a good electrical conductor, the strips may be connected to the supply rings in order to carry the excitation current of the inductor winding.

The invention also provides a wind-driven machine having a propeller mounted on the input shaft of a transmission mechanism, whose output shaft rotationally drives the rotor of a generator which is an electrical machine constructed in accordance with the invention.

BRIEF DESCRIPTION OF THE DRAWINGS

One embodiment of the invention will now be described, by way of example, with reference to the accompanying drawings, in which.

DESCRIPTION OF THE PREFERRED EMBODIMENT

Figure 3:
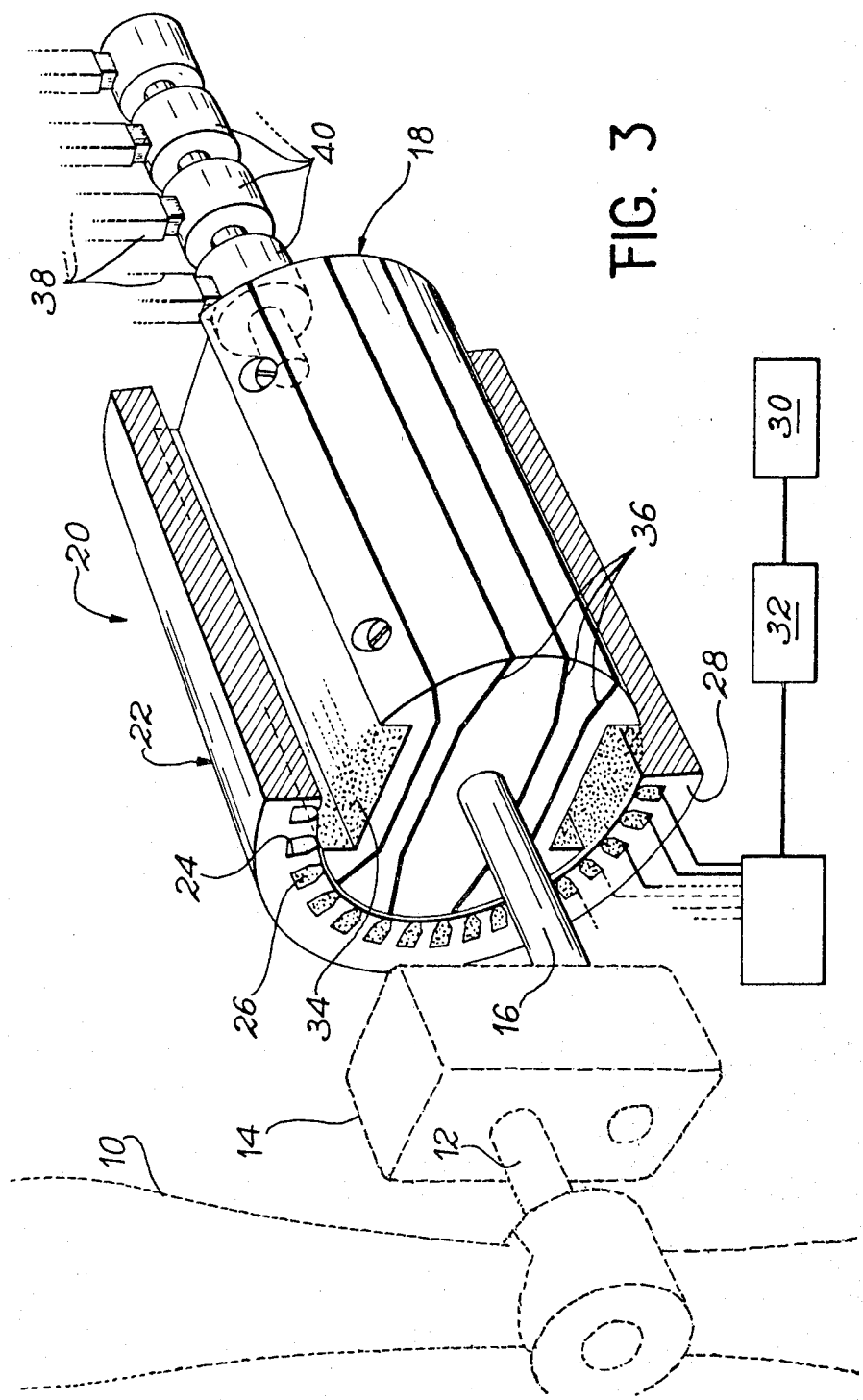
FIG. 3 is a view in perspective showing diagrammatically a wind-driven machine including a generator constructed in accordance with the present invention.

As illustrated diagrammatically in FIG. 3, a wind-driven machine comprises a propeller 10 mounted on an input shaft 12 of a step-up transmission mechanism 14 whose output shaft 16 drives a rotor 18 of an electric generator 20.

In order to limit the speed of rotation of the input shaft 12 of the transmission mechanism 14 to reasonable values when the wind acting on the propeller 10 reaches high speeds, it is customary to provide, between the propeller 10 and the mechanism 14, means which make possible the control of the speed at which the input shaft 12 of the mechanism 14 is driven. Thus, for example, French Pat. Nos. 1,553,046 and 2,139,649 describe variable pitch propellers, particularly such propellers in which the pitch is varied by aerodynamic decoupling while U.S. Pat. No. 4,198,572 describes an eddy-current brake which provides this aerodynamic regulation.

In the embodiment illustrated in FIG. 3, the generator 20 comprises a stator 22 in which the rotor 18 is located and which has longitudinal slots 24 which house the armature windings 26. The stator 22 has thirty-six slots 24 which house thirty-six windings 26 groupd in pairs so as to form eighteen independent winding assemblies the two ends of each of which are accessible at one end face 28 of the stator. One end of each of the winding assemblies formed by the windings 26 is connected to a corresponding end of the other winding assemblies, while the other end of each of the winding assemblies is independently connected to a logic and electronic control assembly comprising in sequence, for each of the winding assemblies of the armature, switching stages 32, and a logic control system 30. This control assembly will be described in greater detail.

In the embodiment illustrated in FIG. 3 the rotor 18 forms the inductor of the generator 20. The rotor 18 consists of an electromagnet having a core of magnetic material, such as soft iron, energized by a winding 34 which is supplied with direct current in a known manner, for example by means of rings 40 and brushes 38. The core of the elecromagnet is preferably fragmented into sections having surfaces which are substantially parallel to the magnetic field set up by the winding 34, the different sections being separated by strips 36 of nonmagnetic material, such as Permalloy or copper. When the strips 36 are of a material which is a good conductor of electricity, such as copper, they can be connected to the rings in order to carry the excitation current.

Figure 4:
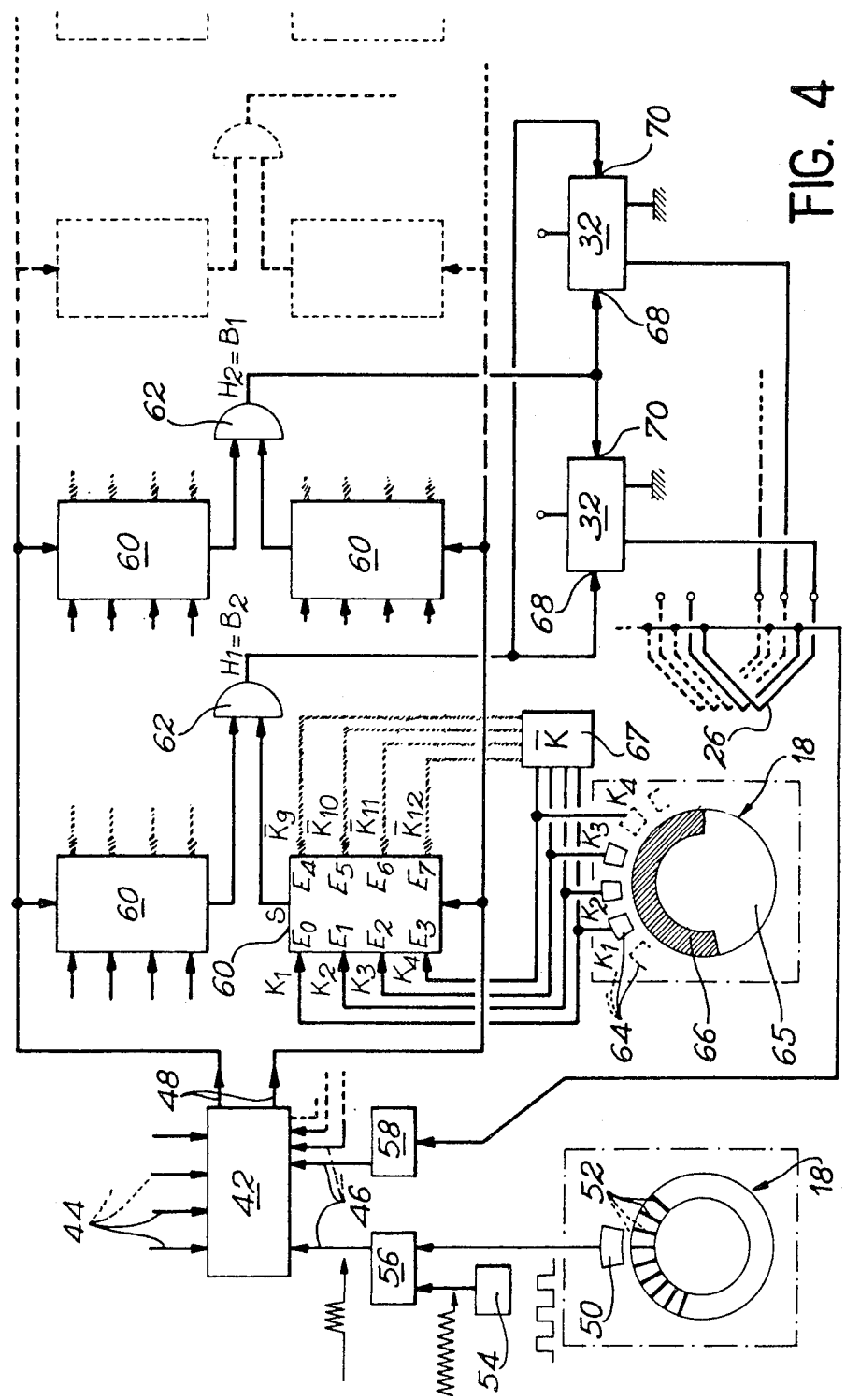
FIG. 4 illustrates the logic and electronic control assembly for controlling the characteristics of the generator of the wind-driven machine of FIG. 3.

The logic system 30 illustrated in particular in FIG. 4, comprises a processor 42, preferably of the mircroprocessor type, which is sensitive both to desired value parameters 44 and to monitoring parameters 46, and provides control insturctions 48 which cause the generator 20 to follow the desired values 44 in dependence on the values of the different monitoring parameters 46. More precisely, the desired value parameters 44 have the object of defining the required type of operation of the generator 20. Thus, the generator 20 may for example operate at constant speed, or with constant torque, or with optimum output. The monitoring parameters 46 always include the speed of rotation of the rotor 18 and, most usually, the value of the current in the armature windings 26. The monitoring parameters may also include safety parameters, such as temperature, and excess current.

The speed of rotation of the rotor 18 is measured by an optical detector 50, for example a phototransistor, mounted on the stator 22 and disposed opposite a ring of successively reflecting and absorbing radial lines 52 formed on the rotor. For preference, there are sixty reflecting lines and there is an equal number of absorbing lines, so that the speed signal transmitted by the phototransistor 50 corresponds directly to the speed of rotation of the rotor 18 in revolutions per minute. A high speed clock 54, formed for example of a multivibrator, transmits continuous pulses. The number of pulses of the clock 54 corresponding to a half-cycle of the speed signal supplied by the phototransistor 50 is determined by a counting logic system 56 which supplies a binary signal constituting the monitoring parameter 46 representing the speed of rotation of the rotor 18. This parameter is transmitted to the microprocessor 42.

An analogue-digital converter 58 of a known kind is connected between the armature windings 26 and the microprocessor in such a manner as to transmit to the microprocessor a monitoring signal 46 representing the current circulating in the windings 26.

The microprocessor 42 may be of any known kind, for example, a microprocessor of the type "IM 6100 of Intersil."

As illustrated in FIG. 4, the coded control signals 48 transmitted by the microprocessor 42 feed the control inputs of an even number of multiplexers 60. In the embodiment described thirty-six multiplexers 60 are grouped together in pairs in such a manner that their outputs are connected to eighteen gates 62 transmitting high connection instructions and low connection instructions applied to the eighteen switching stages 32, each of which acts on one of the armature winding assemblies 26.

The instantaneous position in time and in space of the rotor 18 relative to the stator 22 is given by eighteen optical detectors 64, such as reflection photocouplers, carried by the stator and distributed circumferentially around the rotor opposite a black band 66 fixed on a reflecting disc 65 formed on the rotor. For preference, the black band 66 covers an angle of 190°, so that each of the reflection photocouplers 65 transmits a periodic signal $K_1$ to $K_{18}$, the duration of which is offset by 10° in relation to a half-cycle, the signals transmitted by two neighbouring detectros being offset by 20° relative to one another. The total of the logical signals $K_1$ to $K_{18}$ transmitted by the detectors 64 thus represents the instantaneous position of the rotor 18 relative to the stator 22. The logical signals $K_1$ to $K_{18}$ supplied by the detectors 64 are applied directly to four of the coded inputs $E_0$ to $E_3$ of each of the multiplexers 60. The other coded inputs $E_4$ to $E_7$ of the multiplexers are fed logical signals $\overline{K_1}$ to $\overline{K_{18}}$ complementary to the signals $K_1$ to $K_{18}$ transmitted by the detectors 64, the signals $\overline{K_1}$ to $\overline{K_{18}}$ being formed in an inverter 67.

Figure 5:
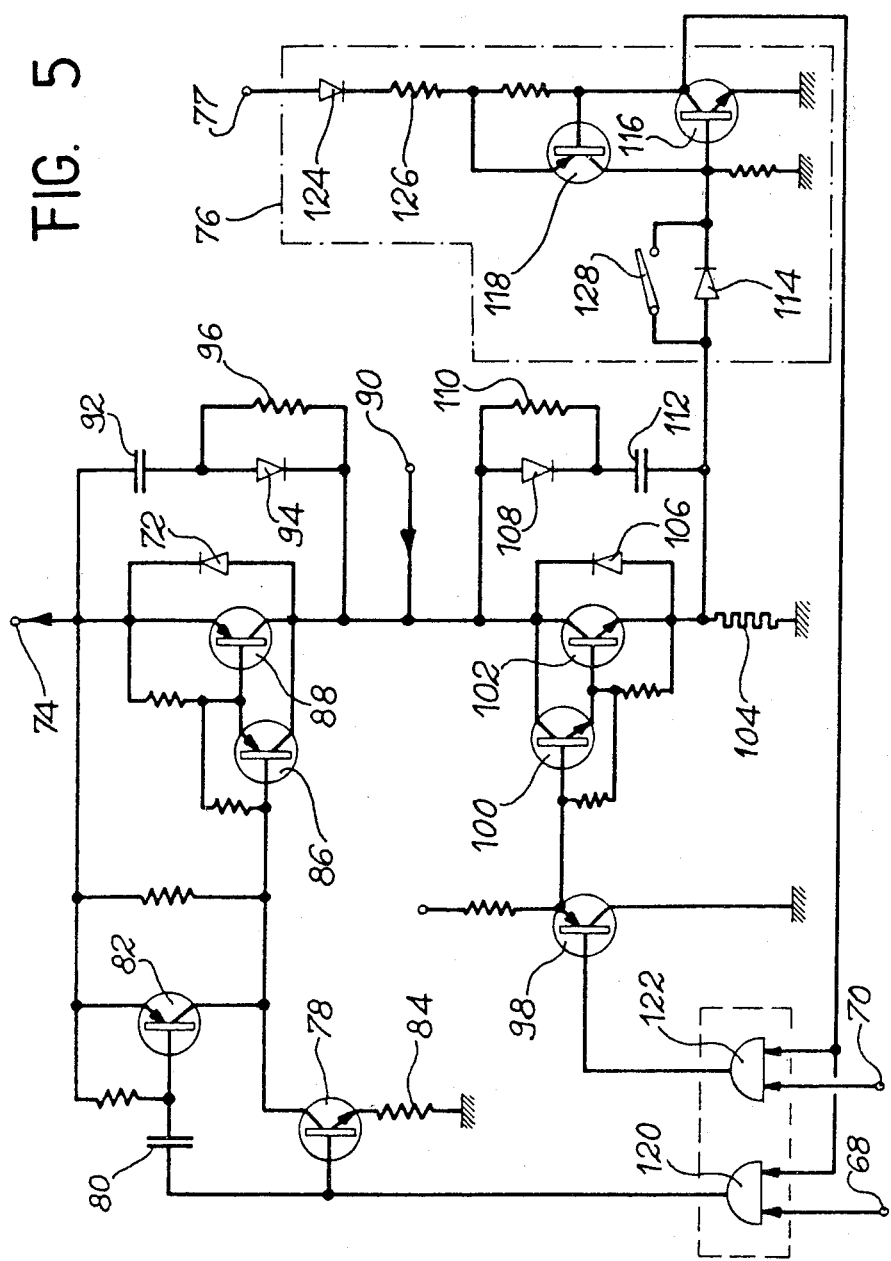
FIG. 5 shows one of the electronic switching stages of the assembly of FIG. 4.

As illustrated in FIG. 5, each of the switching stages 32 is a power transistor stage in which the high connection instructions H enter through an input terminal 68, and in which the low connection instructions B enter through an input terminal 70.

The high connection instructions H which enter each switching means 32 are applied to the base of an NPN transistor 78 and, through a capacitor 80, to the base of a PNP transistor 82. The emitter of the transistor 78 is connected to earth through a resistor 84, while its collector and also the collector of the transistor 82 are connected to the base of a PNP transistor 86. The emitter of the transistor 86 is connected to the base of another PNP transistor 88, while the collectors of the transistors 86 and 88 are connected together and then to an output terminal 90 of the switching stage 32, to which terminal one of the armature winding assemblies 26 is connected, as illustrated in FIG. 4. The emitters of the transistors 82 and 88 are likewise connected together and to a voltage load through a terminal 74. A diode 72 is disposed between the terminals 90 and 74 and is conductive in that direction. A switching assistance system consisting of a capacitor 92 in series with a resistor 96 is preferably provided between the emitter and the collector of the transistor 88. The resistor 96 is shunted by a diode 94 from the capacitor 92 to the collector of the transistor 88. This system permits reliable functioning of the transistor 88. The low connection instructions which enter each switching stage 32 are applied to the base of a PNP transistor 98, whose emitter is connected to the base of an NPN transistor 100. The emitter of the transistor 100 is likewise connected to the base of an NPN transistor 102, whose emitter is connected to earth, defining a low voltage level, through the medium of a shunt 104, while its collector is connected to the output terminal 90. A diode 106 connects the emitter of the transistor 102 to the collectors of the transistors 100 and 102, and it is conductive in that direction. A switching assistance system comprising a resistor 110 and a capacitor 112 is connected in series between the collector and emitter of the transistor 102, a diode 108 being connected in parallel with the resistor 110 and being conductive to the collector of the transistor 102 in the direction of the capacitor 112. This system makes it possible to improve the reliability of the switching transistor 102.

The emitter signal of the transistor 102 is applied to a safety device 76 which comprises a diode 114 in which the current flow is directed towards the base of an NPN transistor 116 and towards the collector of a PNP transistor 118. The signal at the base of the transistor 118 and at the collector of the transistor 116 is applied to one of the inputs of two AND gates 120 and 122, whose other inputs receive high connection instructions H and low connection instructions B admitted at the input terminals 68 and 70. The emitter of the transistor 118 is connected by a terminal 77 to a direct current voltage source (not shown) by way of a light emitting diode 124 and of a resistor 126, while the emitter of the transistor 116 is connected to earth. The diode 114 may be shunted by a switch 128.

Each of the transistors used in the switching stages 32 is suitably biased by appropriate resistors.

The generator having controlled characteristics which is illustrated in FIGS. 3, 4 and 5 operates in the following manner.

When wind acting on the propeller 10 turns the rotor 18 of the generator 20 through the transmission mechanism 14, this rotation produces in the armature 26 a current whose conduction is controlled in time and in space by means of the logic system 30 and the switching stages 32 in such a manner as to respect the set value parameters fed into the microprocessor 42. Thus, in dependence on the set value parameters 44 and the monitoring parameters 46, such as the speed of rotation of the rotor and the current intensity in the armature, the microprocessor 42 transmits control instructions which are applied to the control inputs of the multiplexers 60, in such a manner as to provide at the output S of the multiplexers one of the logical signals $K_1$ to $K_{18}$, or complementary signals $\overline{K_1}$ to $\overline{K_{18}}$ transmitted by the detectors 64 and applied to the coded inputs $E_0$ to $E_7$ of the multiplexers. The two signals K and $\overline{K}$ thus selected by the control instructions 48 transmitted by the microprocessor 42 are added together for each pair of multiplexers 60 by the corresponding AND gate 62, in such a manner as to define high connection instructions $H_1$ to $H_{18}$ and low connection instructions $B_1$ to $B_{18}$ which are applied to the input terminals 68 and 70 of the corresponding switching stage 32. Because of the logic system it is thus possible, by suitably selecting the signals K or $\overline{K}$ originating from the detectors 64 by means of the instructions 48 supplied by the microprocessor 42, to control accurately the beginning and the end, or the duration of time and in space, of the signals H and B transmitted by the AND gates 62, in such a manner as to cause the switching stages 32 to control the conduction in the winding assemblies 26.

In the embodiment illustrated, the microprocessor 42 transmits only two control instructions 48, which are applied respectively to the control inputs of each of the two series of multiplexers 60. Other arrangements are possible and the microprocessor 42 could transmit a different control instruction for each multiplexer or for different groups of multiplexers. Furthermore, in the embodiment illustrated the signal transmitted by the AND gate 62 at the output of each pair of multiplexers 60 may constitute at the same time a high connection instruction $H_1$ to $H_{18}$ for a first switching stage 32 and a low connection instruction $B_1$ to $B_{18}$ for another switching stage 32, thus making it possible to reduce by half the number of multiplexers 60. In another embodiment, which is not illustrated, a group of four different multiplexers could be associated with each switching stage 32.

When a high connection instruction is applied to the input terminal 68 of a switching stage 32, the transistor 88 is unblocked so as to close the circuit containing the winding assembly 26 connected to the output 90 at the high voltage level, in order to initiate the conduction in that assembly, and the transistor 88 is blocked again at the end of the high connection instruction H in order to stop conduction in the corresponding winding assembly 26. When a low connection instruction B is then introduced at the input terminal 70 of one of the switching stages 32, the transistor 102 is unblocked in order to close the circuit containing the corresponding winding assembly at the low voltage level and to initiate conduction in that winding assembly. The end of conduction at the low voltage level is determined by the end of the low connection instruction applied to the input terminal 70, which entails the blocking of the transistor 102.

Figure 1A:
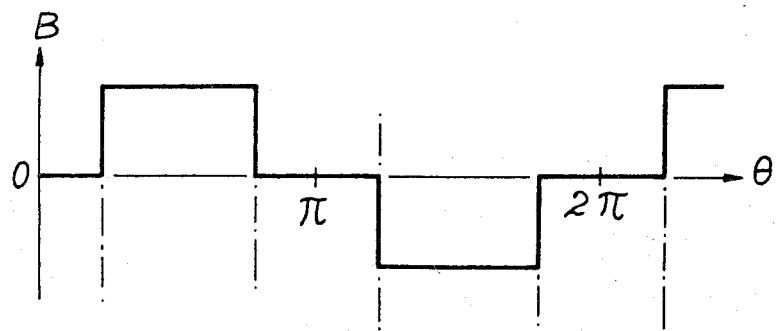
FIGS. 1a and 1b show respectively the variations of the magnetic field in an inductor and of the electric current in one of the turns of an armature of a direct current electric motor of known construction.
Figure 1B:
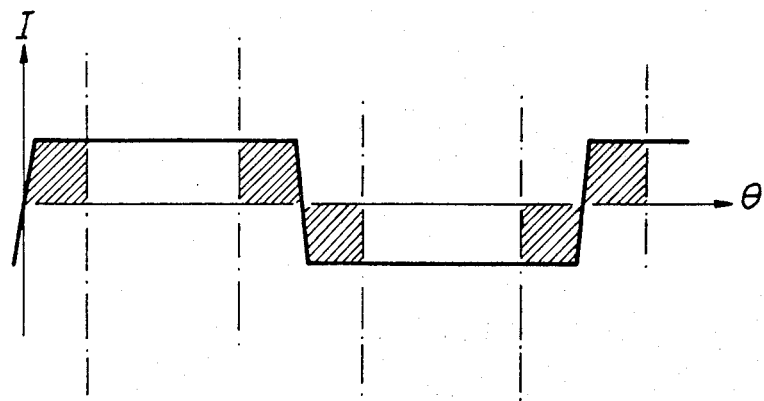
Figure 2:
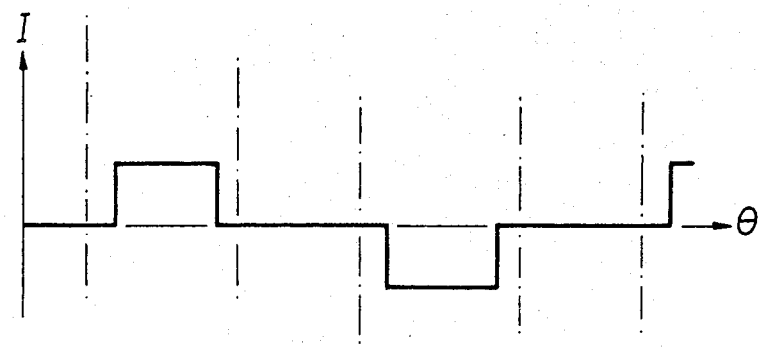
FIG. 2 is a graph illustrating the variation of the current in one of the turns of the armature of an electric motor constructed in accordance with the invention.

The beginning and the end of conduction of each of the winding assemblies 26 of the armature can thus be controlled accurately by selecting and combining the signals K transmitted by the detectors 64, in such a manner as to eliminate losses through the Joule effect (see FIGS. 1b and 2), and in such a manner as to control the characteristics of the generator 20 in dependence on the set point parameters 44.

The control instructions 48 transmitted by the microprocessor 42 may also be such that one or more of the switches 32 is or are held constantly open or closed.

Moreover, when the machine is a motor, it is also possible, by chopping the control instructions 48 transmitted by the microprocessor, to cut off the supply voltage at each winding assembly 26, without it being necessary to use a powerful chopper to reduce the armature voltage in the generator.

The safety device 76 of each switching stage 32, when the switch 128 is open, limits the current by acting as a cut-out which opens the circuit of the corresponding winding assembly as soon as excess current occurs. When the switch 128 is closed, the device 76 effects a simple limitation of current, because this device then opens the circuit as soon as excess current occurs, and closes it as soon as the current has fallen again.

In a modification, which is not illustrated, the electromagnet of the inductor comprises at least three independent winding assemblies in which the beginning and the end of conduction in time and in space are determined by the logical system 30 in a way comparable with that just described for controlling conduction in the winding assemblies 26 of the armature.

In another modification, which is not illustrated, the electromagnet of the inductor comprises a winding divided into a plurality of parts and connected to supply rings to which the current supply is controlled by the logic system 30, for example in such a manner that the shape of the field and its intensity are modified during the operation of the generator.

The invention is not restricted to the embodiments which have been described above as examples, but covers all variants thereof. Thus, the invention is applicable to electrical machines of all types, that is to say both generators and motors, direct current and alternating current, linear or rotary, synchronous or asynchronous. In addition, an electrical machine constructed in accordance with the invention may be used for numerous applications and is not limited to the wind-driven machine described.

The invention is also applicable to machines in which the armature is of a conductive metal and is adapted to be displaced, such as pumps, generators, or actuators of magneto-hydro-dynamic types. The invention can also be applied in metal melting furnaces for controlled stirring of the molten metal.

We claim:

1. An electric machine having controllable characteristics and being capable of transforming electrical energy into mechanical energy comprising:
   a stator;
   a rotor rotatably mounted relative to said stator;
   an armature associated with said stator said armature including at least two independent winding assemblies each being adapted for independent connection;
   field producing means associated with said rotor;
   means for monitoring the instantaneous position of said rotor with respect to said stator and for supplying logic signals which together represent the instantaneous relative position of the armature and field; and
   control means responsive to said logic signals for supplying coded control instructions representative of said instantaneous position, the control means including independent switch means being associated with each winding assembly for selectively switching the connections of each winding assembly, the control means further including an even number of multiplexers having control inputs for receiving the coded control instructions and the logic signals supplied by the monitoring means to supply at their outputs logic signals applicable to the corresponding coded input, the logic signals supplied by each multiplexer being grouped together in twos in order to define connection and switching instructions applied to each of the switching means for controlling said independent connections of said winding assemblies for spatially and temporally controlling the beginning and the end of conduction therein thereby controlling the operating characteristics of said electric machine.

2. An electrical machine according to claim 1, wherein each switching means comprises at least two groups of power semiconductors responsive to the connection instructions and operable to close the circuit of the corresponding winding assembly at the appropriate voltage level.

3. An electrical machine according to claim 2, including disconnection means associated with each switching means for opening for a time period the circuit of the corresponding winding assembly when the current intensity exceeds a predetermined threshold.

4. An electrical machine according to claim 2, including current limiting means associated with each switching means for opening and closing the circuit of the corresponding winding assembly in response to the current flowing therein.

5. An electrical machine according to claim 1, wherein the coded control instructions supplied by the control means are such that the connection instructions applied to at least one of the switching means are chopped, so that the power supplied to the corresponding winding assembly is cut off at a predetermined time.

* * * * *